US010409073B2

United States Patent
Ellsworth et al.

(10) Patent No.: US 10,409,073 B2
(45) Date of Patent: Sep. 10, 2019

(54) VIRTUAL REALITY ATTACHMENT FOR A HEAD MOUNTED DISPLAY

(71) Applicant: Tilt Five Inc., Sunnyvale, CA (US)

(72) Inventors: Jeri J. Ellsworth, San Jose, CA (US); Ken Clements, Los Gatos, CA (US)

(73) Assignee: Tilt Five, Inc, San Jose, CA (US)

( * ) Notice: Subject to any disclaimer, the term of this patent is extended or adjusted under 35 U.S.C. 154(b) by 342 days.

(21) Appl. No.: 15/331,237

(22) Filed: Oct. 21, 2016

(65) Prior Publication Data

US 2017/0045746 A1 Feb. 16, 2017

Related U.S. Application Data

(63) Continuation-in-part of application No. 14/267,325, filed on May 1, 2014, now abandoned.

(60) Provisional application No. 61/855,536, filed on May 17, 2013, provisional application No. 61/961,446, filed on Oct. 15, 2013, provisional application No. 62/244,935, filed on Oct. 22, 2015.

(51) Int. Cl.
| | |
|---|---|
| *G02C 9/02* | (2006.01) |
| *G02B 5/04* | (2006.01) |
| *G02B 27/01* | (2006.01) |
| *G06F 1/16* | (2006.01) |
| *G02B 5/30* | (2006.01) |

(52) U.S. Cl.
CPC ............ *G02B 27/0176* (2013.01); *G02B 5/04* (2013.01); *G02B 5/30* (2013.01); *G02B 27/017* (2013.01); *G02B 27/0172* (2013.01); *G02C 9/02* (2013.01); *G06F 1/163* (2013.01); *G06F 1/1639* (2013.01); *G02B 2027/0118* (2013.01); *G02B 2027/0138* (2013.01); *G02B 2027/0156* (2013.01); *G02B 2027/0178* (2013.01); *G02B 2027/0187* (2013.01)

(58) Field of Classification Search
CPC .... G02B 27/17; G02B 27/176; G02B 27/172; G02B 5/04; G02B 5/30; G02C 9/02; G06F 1/163; G06F 1/1639; G06F 1/203; G06F 1/1632
USPC ........................................................ 345/8, 9
See application file for complete search history.

(56) References Cited

U.S. PATENT DOCUMENTS

| | | | | | |
|---|---|---|---|---|---|
| 5,805,120 | A | * | 9/1998 | Yamada | A63F 9/0291 345/7 |
| 6,937,400 | B2 | * | 8/2005 | Olsson | A61B 1/00048 359/630 |
| 7,002,534 | B2 | * | 2/2006 | Park | G02B 27/0172 345/8 |
| 2001/0038361 | A1 | * | 11/2001 | Tanijiri | G02B 27/0172 345/8 |
| 2001/0050660 | A1 | * | 12/2001 | Maeda | G02B 27/0172 345/8 |
| 2003/0030596 | A1 | * | 2/2003 | Park | G02B 27/0172 345/8 |

(Continued)

*Primary Examiner* — Albert K Wong
(74) *Attorney, Agent, or Firm* — Ken Clements

(57) ABSTRACT

An attachment for a projected head mounted display redirects images designed to be projected on retroreflective screens directly back into the eyes of a user. This permits, for example, the head mounted display to be switched from an augmented reality mode to a virtual reality mode. The attachment can be engaged or disengaged from the head mounted display. The attachment includes a freeform prism.

18 Claims, 10 Drawing Sheets

(56) References Cited

U.S. PATENT DOCUMENTS

| | | | |
|---|---|---|---|
| 2005/0057439 A1* | 3/2005 | Hata | A42B 1/245 345/8 |
| 2011/0175799 A1* | 7/2011 | Yamada | G02B 27/0172 345/8 |
| 2014/0085190 A1* | 3/2014 | Erinjippurath | G06F 3/012 345/156 |
| 2014/0152531 A1* | 6/2014 | Murray | G06F 1/1632 345/8 |
| 2014/0266987 A1* | 9/2014 | Magyari | G02B 27/0172 345/8 |
| 2014/0266990 A1* | 9/2014 | Makino | G02B 27/017 345/8 |
| 2014/0347252 A1* | 11/2014 | Miyawaki | G02B 27/017 345/8 |
| 2016/0179148 A1* | 6/2016 | Takagi | G06F 1/203 345/8 |

\* cited by examiner

VIRTUAL REALITY ATTACHMENT FOR A HEAD MOUNTED DISPLAY

CROSS REFERENCE TO RELATED APPLICATIONS

The present application is a continuation-in-part of U.S. patent application Ser. No. 14/267,325, which in turn claims the benefit of provisional patent application No. 61/855,536 filed on May 17, 2013, entitled "Stereo 3D augmented reality display using retro-reflective screens and per eye filtering" by Jeri J. Ellsworth and No. 61/961,446 filed on Oct. 15, 2013, titled "Reconfigurable Head Mounted Display System" also by Jeri J. Ellsworth, the entire contents of which are fully incorporated by reference herein.

This application also claims the benefit of provisional application No. 62/244,935, the entire contents of which are fully incorporated by reference.

FIELD OF THE INVENTION

The present invention is generally related to head mounted displays (HMDs), such as augmented reality and virtual reality HMDs.

BACKGROUND OF THE INVENTION

One example of a head mounted display (HMD) is an augmented reality (AR) HMD. There are many examples of fixed optics head mounted display headsets, which typically consist of a display or plurality of displays and relay optics which deliver computer generated graphics to the eyes of users. Additional fixed optics may be included that combines light from the real world and allow graphics to be overlaid over that which the user views in the real world. Subsystems are often associated with these displays to track the sight line of the user so as to provide information that drives the rendering of a CGI scene for view in stereo vision, simulating 3D vision.

However, consider the example of a HMD designed to operate as an AR HMD. It is possible that a user may desire to also play a virtual reality (VR) game. A problem arises in that HMDs are typically designed to work either as an AR headset or a VR headset but not both.

SUMMARY OF THE INVENTION

An attachment for a head mounted display is disclosed that permits a mode of operation of the head mounted display to be changed. In one embodiment, the attachment, when engaged, redirects images designed to be projected onto a retroreflective screen. The redirection may be used such that the output of the projectors are deflected and conditioned for near-eye presentation. In one embodiment, this permits a change from an augmented reality (AR) mode to a virtual reality (VR) mode. The AR mode may be for retroreflective AR. Alternately, other options are possible such as a change from a retroreflective AR mode to a see-through AR mode.

In one embodiment, the attachment comprises a housing having a freeform prism as the primary optical element that is used to redirect the images from the head mounted projectors of the head mounted display back into the eyes of the user. In one embodiment this comprises an inverted arrangement of the freeform prism to accept the projected images on the same side of the prism as the user's eyes.

The freeform prism may be a solid prism. However, in one embodiment a hollow prism with reflective or partially reflective surfaces is used.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is better understood when read in conjunction with the appended drawings. For the purpose of illustrating the implementations, there is shown in the drawings example constructions of the implementations; however, the implementations are not limited to the specific methods and instrumentalities disclosed.

DETAILED DESCRIPTION

A head mounted display system for the display of stereoscopic video images may include projection from one or more head mounted projectors onto a retroreflective screen for return to the eyes of a user. As examples, the head mounted display may include two projection display systems arranged for light to be projected and returned to the user from retroreflective surfaces in the world, together with a camera for tracking a marker.

Figure 1:
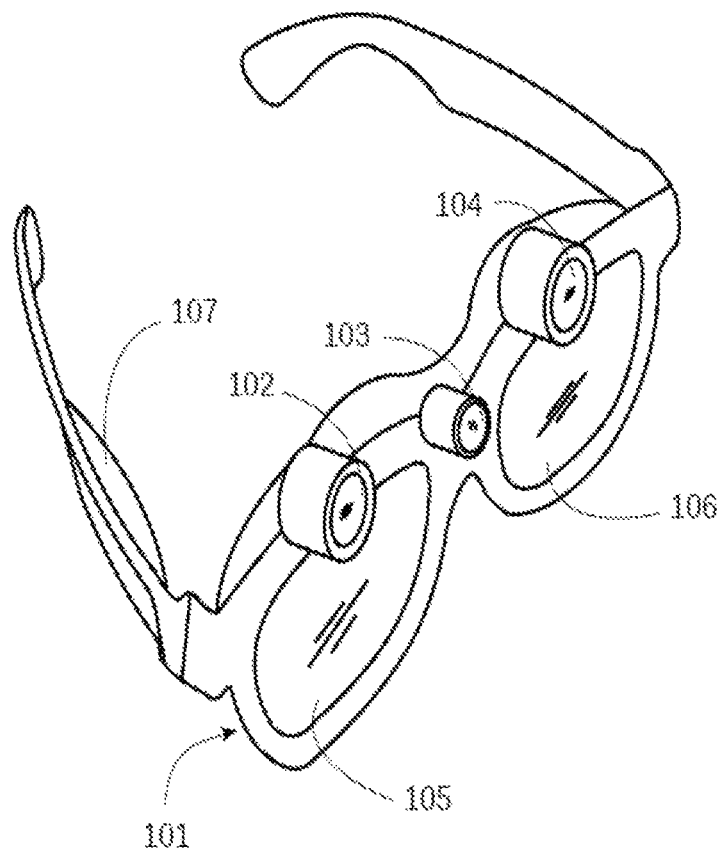
FIG. 1 illustrates an embodiment of an outward projected image headset.

FIG. 1 illustrates an example of a head mounted display. A frame 101 supports a pair of image projectors 102 and 104, a tracking camera or cameras 103 and viewing lenses 105 and 106. A compartment is shown 107 that may hold power cells and driver electronics as well as wireless electronic communication devices. The viewing lenses 105 and 106 operate in conjunction with the image projectors 102 and 104 to reject light that originates from the projector on the opposite side of the frame. For example, this light rejection may include selective orthogonal polarization (planer or circular), or time division multiplexed active shutters, or spectral filtering by emitter physics or software selected colors or passive filtering, or other such means known in the art.

Attachment Examples: Mirror Optics

An attachment apparatus and method using mirror optics will now be described that permits images from the HMD to be redirected directly back into the eyes of the user. This permits, for example, a switch in a mode operation of the HMD, such as from augment reality (AR) to virtual reality (VR). Examples include rotating the attachment in or out of the optical path, clipping on/off the attachment, or otherwise engaging/disengaging the attachment.

The headset in FIG. 1 may be converted from projected mode to an enclosed near to eye virtual reality display by means of a "clip on" optical relay system attachment that redirects the output of the projectors to an image forming path steered directly to each of the corresponding user eyes. A cutaway diagram of the optical path of one side of the attachment is shown in FIG. 2A.

Figure 2A:
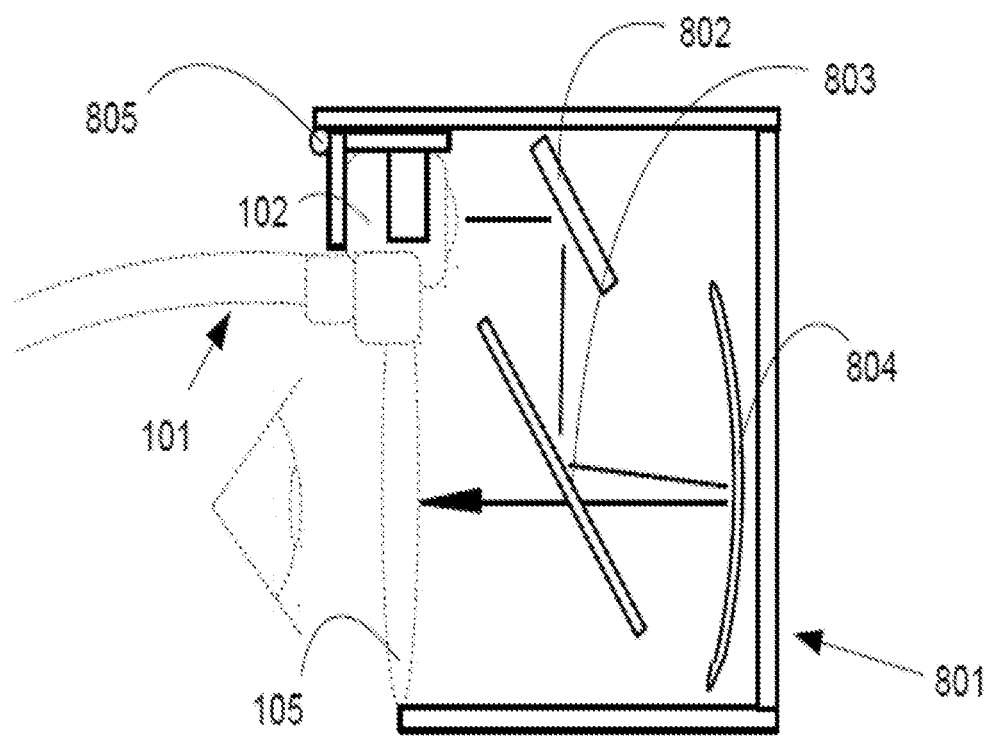
FIG. 2A illustrates an embodiment of an attachment including an optical path for "clip on" reconfiguration to closed virtual reality mode of operation.

FIG. 2A shows a redirection arrangement in which a housing enclosure 801 clips onto one or more projectors 102, 104 mounted to glasses frame 101. Mirrors 802-804 redirect and focus the light from the projector to pass through the glasses lens 105 and into the eye of the user. A hinge 805, clamp, clip, or other attachment means may be provided to engage/disengage the attachment from the optical path of the head mounted display In one embodiment, the enclosure 801 is held in place by a clamping means to projector housing 102 on the headset frame 101 with hinge mechanism 805. The enclosure 801 contains means (not shown) to hold in place an arrangement of optical elements that steer the images generated by the projectors so as to be presented coaxial to the eyes of the user, and collimated to generate a visible image.

In the shown embodiment the image from projector 102 is directed downward by mirror 802 and then forward by beamsplitter 803 and then reflected by shaped mirror 804 that provides a collimated image of correct polarization to go back through beamsplitter 803 and headset viewing lens 105. Diffractive, reflective or refractive optical elements may be placed in the optical system to change image properties. While this optical path has been described for this embodiment, many examples exist of near eye optical relay means used in the art of head mounted display, and those skilled in the art may design any number of alternate paths for this attachment.

Figure 2B:
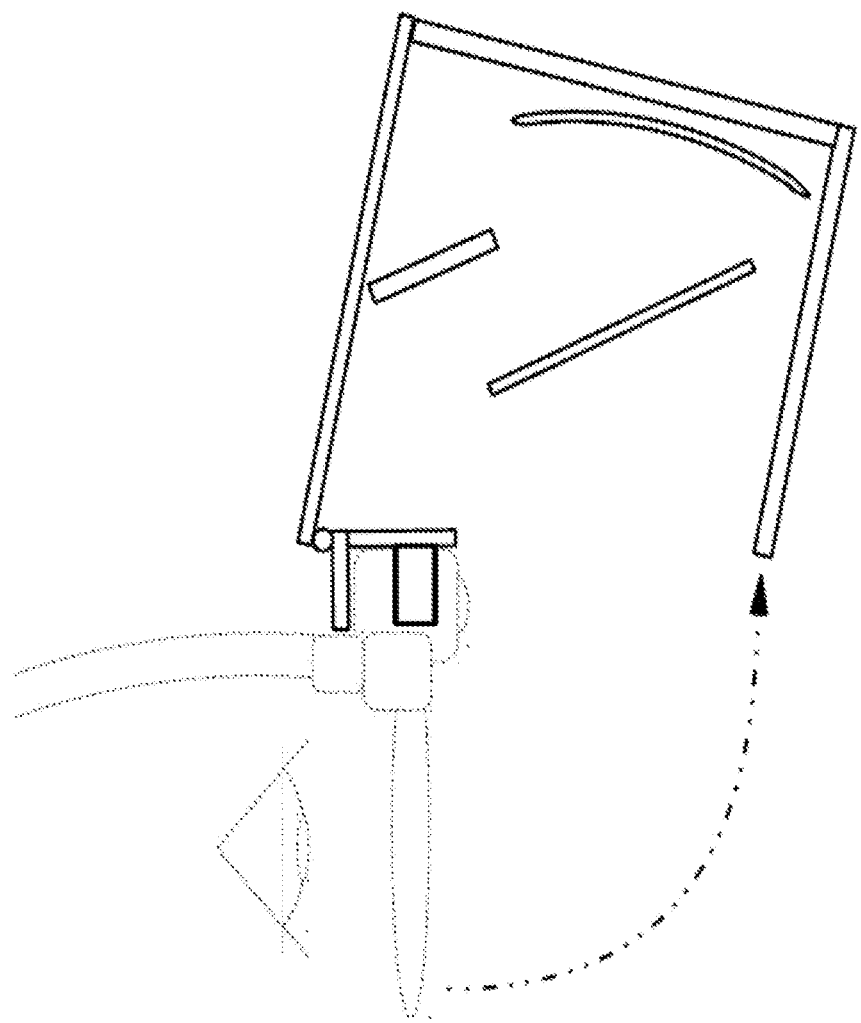
FIG. 2B illustrates an embodiment of the attachment showing a hinged "flip up" to switch modes.

FIG. 2B shows the attachment as "flipped up" by means of hinge 805 such that the user may switch modes without completely removing the attachment. It is anticipated that the headset will have means (not shown) to electrically or optically detect the presence and position of the attachment such that the firmware and software associated with the system may make image corrections (such as inversion) necessary to support the mode in use. It is also anticipated that mechanical means (not shown) will be included such that the user can "flip down" the attachment from the raised position with a quick nodding head movement so as to switch to enclosed virtual reality mode without removing hands from keyboards, game controllers or other equipment.

Figure 2C:
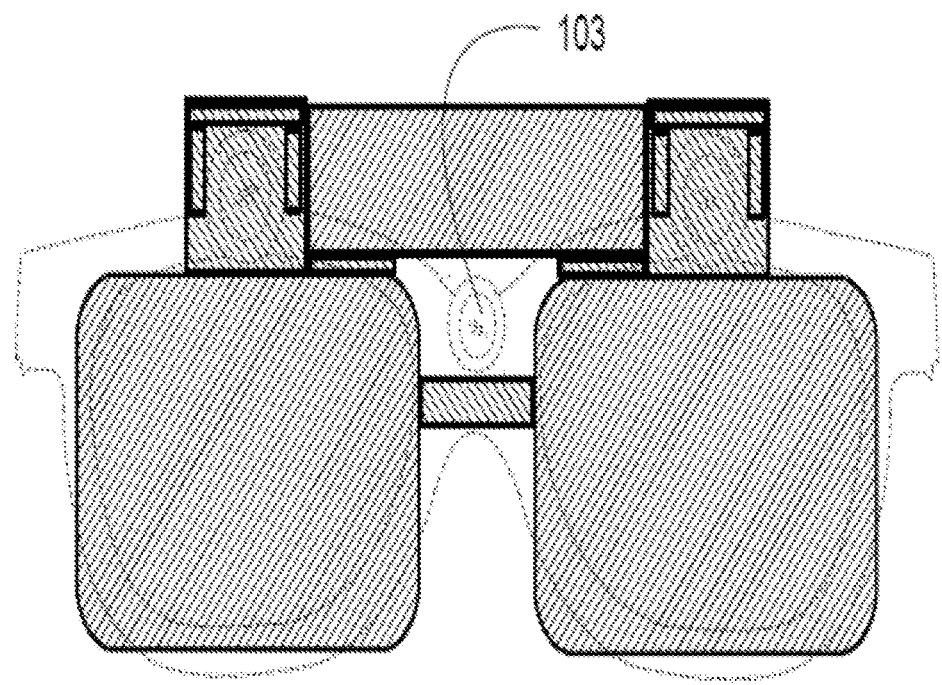
FIG. 2C illustrates an embodiment showing a "transparent" view of "clip on" apparatus in closed position.

FIG. 2C shows a front view of the attachment clamped to the projectors, in the engaged position covering the face of the headset. This is drawn in x-ray style to show the headset behind it, but it should be considered as opaque. Those skilled in the art may design many other enclosures and means of attachment, such as by means of magnets or snaps or hook and loop fasteners etc., but in all designs, the fixture must not cover the camera 103, or restrict its field of view.

Figure 2D:
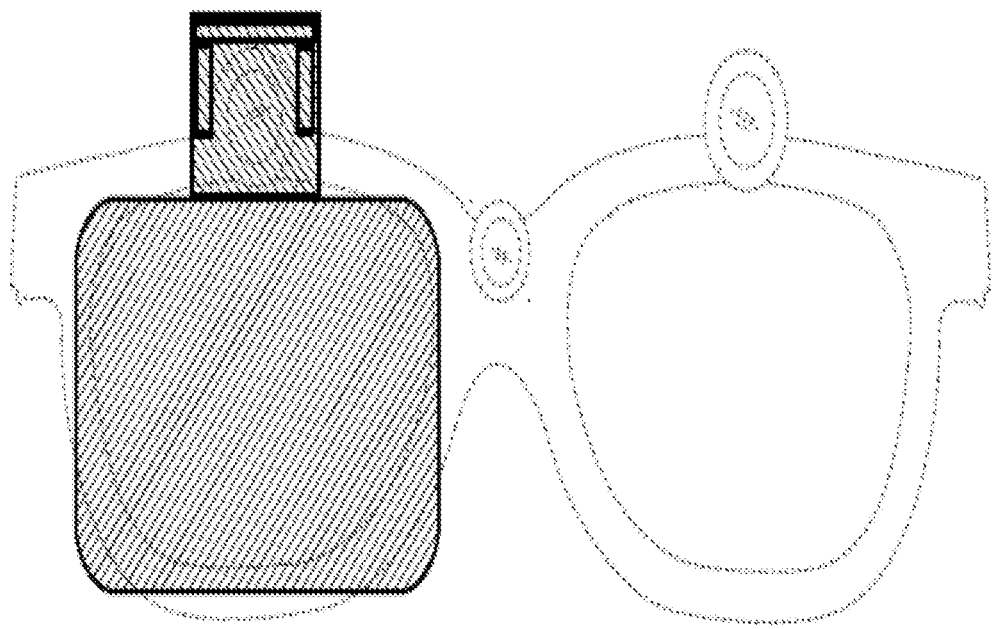
FIG. 2D illustrates a side application of "clip on" apparatus in accordance with an embodiment.

Also nothing in this description precludes an implementation of half of the attachment, shown in FIG. 2D, such as would be used for augmented reality applications feeding closed images or information to only a single eye.

Figure 3:
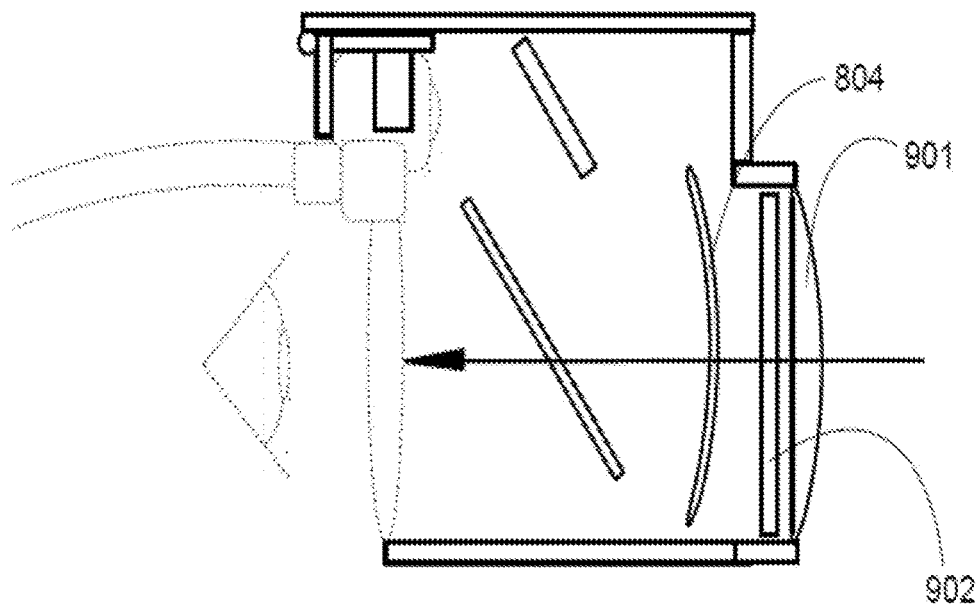
FIG. 3 illustrates another embodiment of a "clip on" reconfiguration for mixed real/virtual mode.

In some augmented reality applications it is desirable to mix the images generated by the computer graphics system with the actual images of the real world. In order to achieve this end, the attachment may embody a means to provide a path for light to enter from the outside world as shown in FIG. 3. In this embodiment, the enclosure is fitted with an opening and a forward facing lens or lens system 901, to gather external light and pass it through filtering means 902 and semi reflective mirror 804 before joining the coaxial optical path described above in FIG. 2A. Optics, such as field of view, anamorphic, color correction and other properties of the projection or external path, can be modified by attachments with refractive, diffractive and reflective optical elements. The filtering means may include polarizers or electronic shutters, or spectral filters, or other means of masking or blocking parts of the image gathered by lens or lens system 901. Electronic means for control of said optical operations are not shown but are known to those skilled in the art.

Attachment Examples: Freeform Prism

Figure 4:
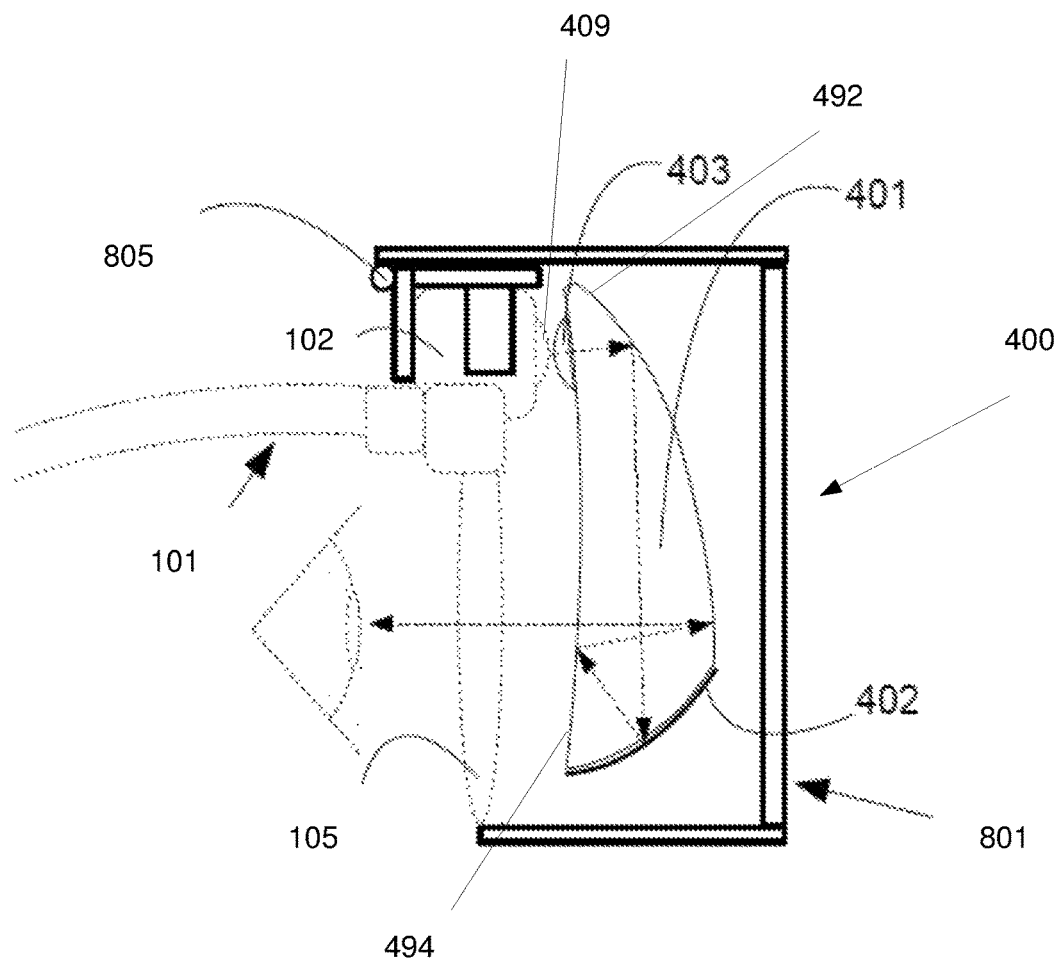
FIG. 4 is an embodiment using an inverted freeform prism for image redirection.

FIG. 4 shows an embodiment of an attachment 400 to perform redirection using an inverted freeform prism 401. The attachment 400 includes a housing 801 to enclose the optical components of the attachment. For the purpose of illustration, a side view is provided showing elements of the head mounted display in phantom (dashed lines) and the eye (in phantom) of a user.

The freeform prism 401 is typically designed with a refractive index and a shape to permit optical rays to traverse the prism and experience total internal reflection (TIR) along an optical path in the prism until the ray exits the prism. For the case of a solid prism, there are certain angles of incidence for which TIR occurs when a light ray traveling in a prism having an index of refraction strikes a boundary with a lower index of refraction (e.g., a dielectric/air interface). In this example, the freeform prism has a narrow end 492 and a wide end 494. An exemplary light ray is illustrated entering the freeform prism 401 and traversing the prism with TIR each time it reflects off an edge of the freeform prism until it exits the freeform prism.

In FIG. 4 a projector 102 of a head mounted display injects light on the same side of the freeform prism 401 as the eye of the user. The light of the projected images is projected through a projection aperture 409 and enters a portion of the freeform prism 401 such as via a section of the narrow end 492 of the freeform prism 401. An optional lens 403 may be included to improve coupling into the freeform prism The injected light propagates to the screen 402 by the same TIR that then directs the image from the screen 402 to the user's eye through glasses lens 105. The screen 402 may, for example, be a reflecting screen formed or mounted on a portion of the surface of the freeform prism 401. The design of the freeform prism 401 and the screen 402 is selected such that images from the projector 102 are brought to focus upon the screen and enough light is reflected from the screen to be directed back to the eye or eyes of a user to view the projected image. In one embodiment the screen 402 is a diffuse reflecting screen.

Features are provided to permit the attachment 400 to be engaged or disengaged from the optical path of the head mounted display. This may include, for example, hinges, clamps, clips, fasteners, magnets, detents, springs, etc.

Figure 4A:
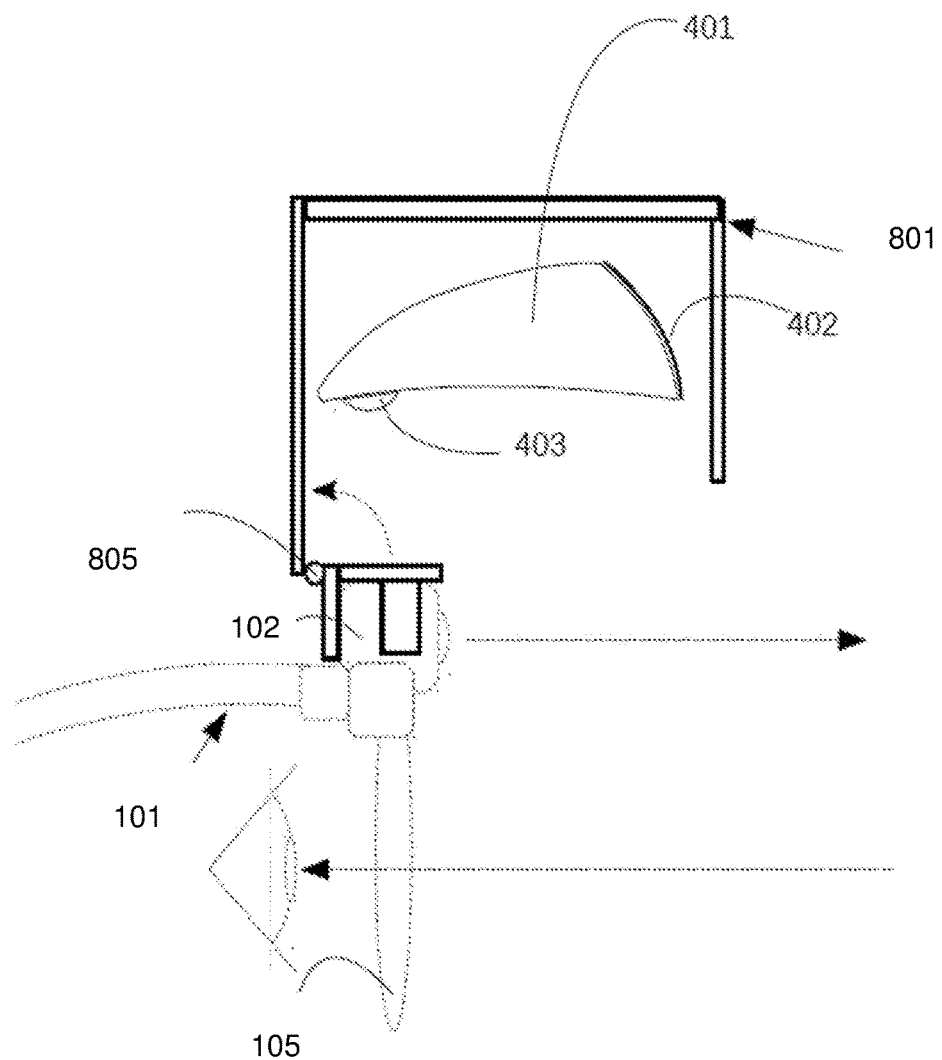
FIG. 4A illustrates an embodiment of the attachment hinged in a flip up position to switch modes.

FIG. 4A illustrates an example in which a hinge 805 is used to rotate the attachment into or out of the optical path. That is, FIG. 4A illustrates the attachment 400 disengaged from the operation of the head mounted display. It will be understood that in alternative embodiments the attachment could be removed entirely from the head mounted display, such as in a clip-on, clip off embodiment.

The hinge 805 in FIG. 4A may have an internal spring to offset the weight of the rotating attachment and a detent to help hold the attachment in the open position when the user places it there. Additionally, in one embodiment, the housing is configured to permit a user to change the position of the housing without using their hands. For example, these components may be arranged to hold the attachment in an AR position (out of the way, as in FIG. 4A) until the user performs a head bob to flick it into VR mode (FIG. 4) without changing positions of the user's hands.

In one embodiment, the head mounted display includes a detector to detect that the attachment is engaged and perform any necessary adjustments to the images. This may, for example, include using an adjustable lens to alter the focal distance of the image projector. In one embodiment the projector 102 has an internal mechanism to detect that the hinge 805 is closed. This mechanism may move lenses to make the focal distance of projector 102 more compatible with the optical design of prism 401. In a similar manor, a lens 403 may be added to the optical path if needed, or it may be fabricated as part of the shape of freeform prism 401.

Variations on the optical design of the freeform prism and associated components are contemplated and within the scope of the present invention.

Figure 5:
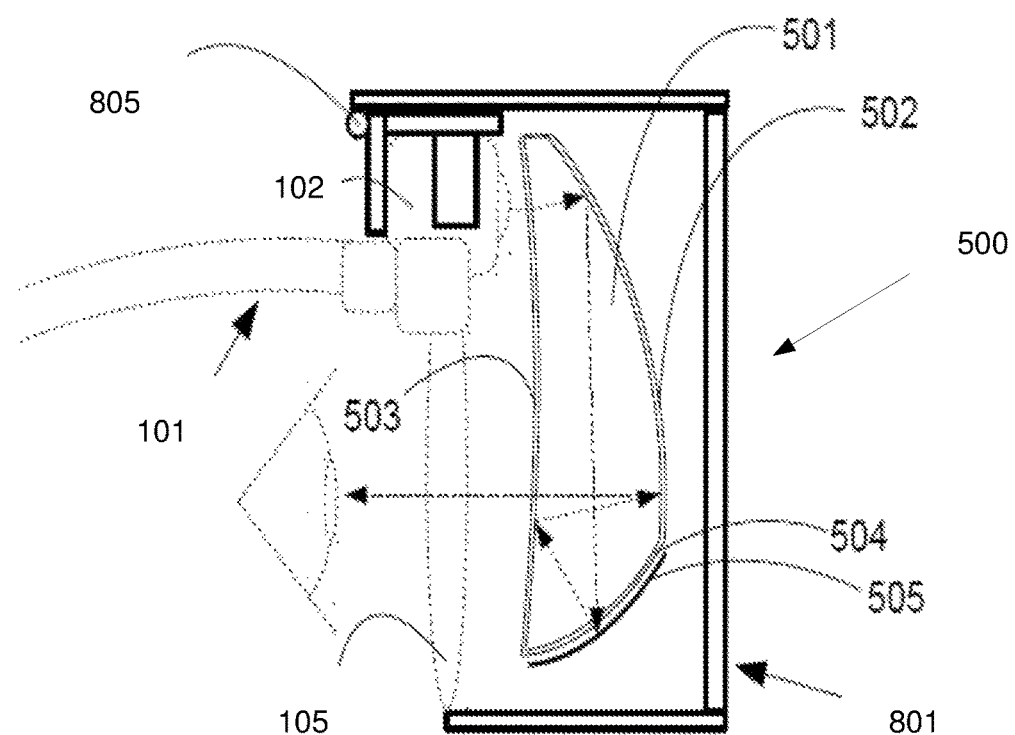
FIG. 5 is an embodiment using a hollow version of the freeform prism.

FIG. 5 shows an alternate embodiment of an attachment 500 in which the freeform prism of FIG. 4 is replaced by a hollow structure 501 of glass or transparent plastic or other transparent material with internal reflective or partially reflective surfaces 502 and 503, transparent surface 504 and reflective screen 505. Reflective screen 505 may be formed or mounted on a portion of the transparent surface 504. In one embodiment the reflective screen 505 is a diffuse reflecting screen. This hollow form of prism is also known in the optics art. As illustrated by the optical ray in FIG. 5, the optical operation is similar to that disclosed in FIG. 4 in that the optical ray traverses the hollow prism through several bounces until it exits the prism. However, in the case of a hollow prism, reflective or partially reflective surfaces are used to guide the optical ray. That is, the reflectivity of the surfaces is used instated of TIR from a dielectric/air interface.

Figure 6:
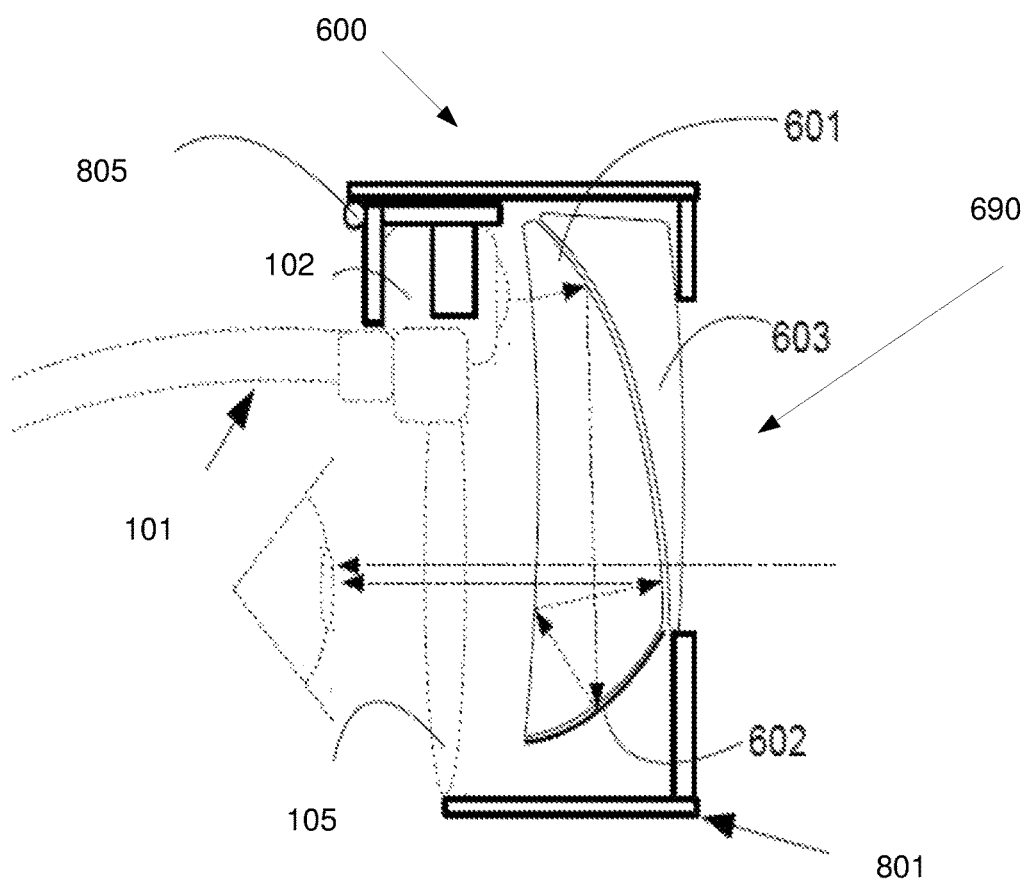
FIG. 6 is an embodiment showing an inverted freeform prism with see-through corrector.

FIG. 6 illustrates an attachment 600 designed to change from retroreflective AR to see-through AR, also sometimes called see-through augmented reality. As shown in FIG. 6, a so called "corrector" prism 603 is fitted to the front of the main freeform prism 601 such that their combined curvature cancels out refraction of the light from the outside world and results in the mixing of the images from the computer graphics generator and the light from the outside world. A screen 602 is provided, which may be similar to those described in regards to the embodiment of FIG. 4. The arrangement of FIG. 6 shows an inverted corrector to match the inverted freeform prism, both located behind a window 690 in the housing 801. That is, the addition of corrective prism (and a front window in the housing), allows external light to travel through and provide optical images to the user's eye or eyes that are merged with the output of the projector.

Those of skill in the art will also understand that a transparency control or shutter may be added to corrector prism 603 such that outside light be limited on demand to, again, switch from AR to VR.

The use of a freeform prism provides various advantages over the use of mirror optics. Comparing FIG. 4 with FIG. 2A, the mirror optics are replaced with a freeform prism 401 with a diffusive reflecting screen 402. This permits a reduction in size and complexity of the optical components required to redirect light. The degree of size reduction depends on the mirror arrangements and all the (not shown) holding brackets for the internal parts. However, someone skilled in the art would notice a significant improvement in both look and feel with even modest reductions in size. Additionally, the use of a solid or hollow prism eases the problems of alignment and maintaining optics clean. For example, the embodiment of FIG. 2A has several optical components that need to be aligned and sealed from contamination.

Illustrative embodiments have been described by way of example herein. Those skilled in the art will understand, however, that changes and modifications may be made to these embodiments without departing from the true scope and spirit of the elements, products, and methods to which the embodiments are directed, which is defined by our claims.

What is claimed is:

1. An apparatus to reconfigure a mode of operation of a head mounted projection display for augmented reality, comprising:
   a housing having a mechanical attachment or a rotating attachment; and
   a freeform prism within the housing wherein the mechanical attachment removably attaches the housing to the head mounted projection display such that the projector of the head mounted display projects an image into the freeform prism that is at least partially redirected toward an eye of a user through the viewing lens of the head mounted projection display when the housing is attached to the head mounted projection display by the mechanical attachment and wherein the rotating attachment allows the housing to move between a first position wherein the projector of the head mounted projection display projects an image into the freeform prism that is at least partially directed toward the eye of the user through the lens of the head mounted projection display and a second position wherein the projector of the display does not project an image into the freeform prism while the housing is attached to the head mounted projection display.

2. The apparatus of claim 1, further comprising a diffuse reflecting screen mounted to a portion of the freeform prism such that said projected images are brought to focus upon said diffuse reflecting screen.

3. The apparatus of claim 1, wherein when the housing is in the second position the freeform prism does not interfere with the projected image of the head mounted projection display.

4. The apparatus of claim 1, wherein the at least one movable mechanical linkage comprises a feature to attach or detach the housing to the outer surface of the head mounted display.

5. The apparatus of claim 1, wherein the freeform prism includes a first section and a second section such that the first section of the freeform prism is adjacent the projection aperture of the head mounted projection display and the second section of the freeform prism is adjacent to the at least one viewing lens of the head mounted projection display when the image is projected into the freeform prism.

6. The apparatus of claim 5, further comprising a diffuse reflecting screen mounted to the freeform prism in a position such that images brought to focus upon said diffuse reflecting screen and light reflected from said screen is directed back to the eye or eyes of a user to view the projected image.

7. The apparatus of claim 1, wherein the mechanical attachment is selected from the group consisting of: a spring, a clip, a clamp, magnets, snaps, hooks and fasteners.

8. The apparatus of claim 1, wherein said freeform prism is a solid prism having total internal reflection.

9. The apparatus of claim 1, wherein the freeform prism is hollow with internally reflective surfaces.

10. The apparatus of claim 1, further comprising a corrector prism fitted to a surface of the freeform prism and a window in the housing to mix images form the projector with light from the outside world to provide a see through augmented reality mode.

11. An apparatus to reconfigure a mode of operation of a head mounted projection display having an image projector and at least one viewing lens, comprising:
 a housing having a mechanical attachment or a rotating attachment; and
 a freeform prism having a narrow end and a wide end located within the housing wherein a diffuse reflecting screen is mounted adjacent the wide end wherein the freeform prism has a shape so that images entering the narrow end are brought into focus on the diffuse reflecting screen, and wherein the mechanical attachment removably attaches the housing to the head mounted projection display such that the projector of the head mounted display projects an image into the narrow end of freeform prism that exits the wide end that is at least partially redirected toward an eye of a user through the viewing lens of the head mounted projection display when the housing is attached to the head mounted projection display by the mechanical attachment and wherein the rotating attachment allows the housing to move between a first position wherein the projector of the head mounted projection display projects an image into the narrow end of the freeform prism that exists the wide end that is at least partially directed toward the eye of the user through the lens of the head mounted projection display and a second position wherein the projector of the display does not project an image into the freeform prism while the housing is attached to the head mounted projection display.

12. The apparatus of claim 11, wherein when the housing is in the second position the freeform prism does not interfere with the projected image of the head mounted projection display.

13. The apparatus of claim 11, wherein the mechanical attachment is selected from the group consisting of: a spring, a clip, a clamp, magnets, snaps, hooks and fasteners.

14. The apparatus of claim 11, wherein said freeform prism is a solid prism having total internal reflection.

15. The apparatus of claim 11, wherein the freeform prism is hollow with internally reflective surfaces.

16. The apparatus of claim 11, further comprising a corrector prism fitted to a surface of the freeform prism and a window in the housing to mix images from the projector with light from the outside world to provide a see through augmented reality mode.

17. A system, comprising:
 a head mounted projection display having at least one image projector and at least one viewing lens;
 a housing having a freeform prism attachable to the head mounted projection display; and
 a mechanical attachment or rotating attachment to place the at least one image projector in optical communication with the freeform prism wherein the system is in an augmented reality mode when the head mounted display projects an image and receives a retroreflected image through the at least one viewing lens and wherein the system is in a virtual reality mode when the projector is in optical communication with the freeform prism and the image from the projector is directed into the freeform prism and output from the freeform prism through the at least one viewing lens.

18. The system in claim 17, further comprising:
 a corrector prism fitted to the surface of the freeform prism wherein the system is in a see through augmented reality mode when the image from the projector is directed into the freeform prism and an outside light is directed through the corrector prism into the freeform prism simultaneously.

* * * * *